Dec. 18, 1956  J. G. SEDGWICK  2,774,207
POWER MOWER WITH PIVOTAL CONNECTION
BETWEEN CARBURETOR AND MOTOR
Filed July 2, 1953  5 Sheets-Sheet 2
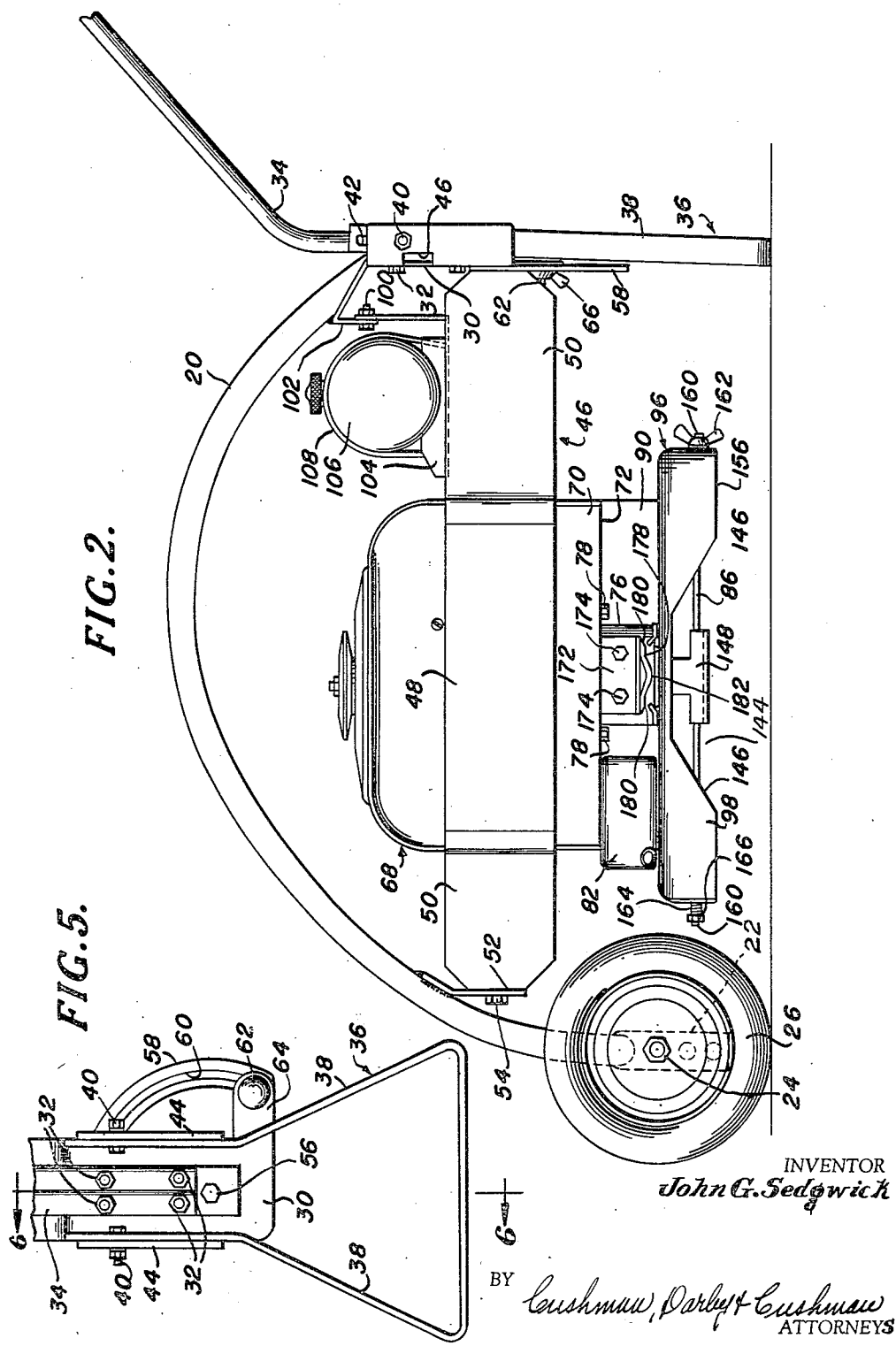
INVENTOR
John G. Sedgwick
BY Cushman, Darby & Cushman
ATTORNEYS

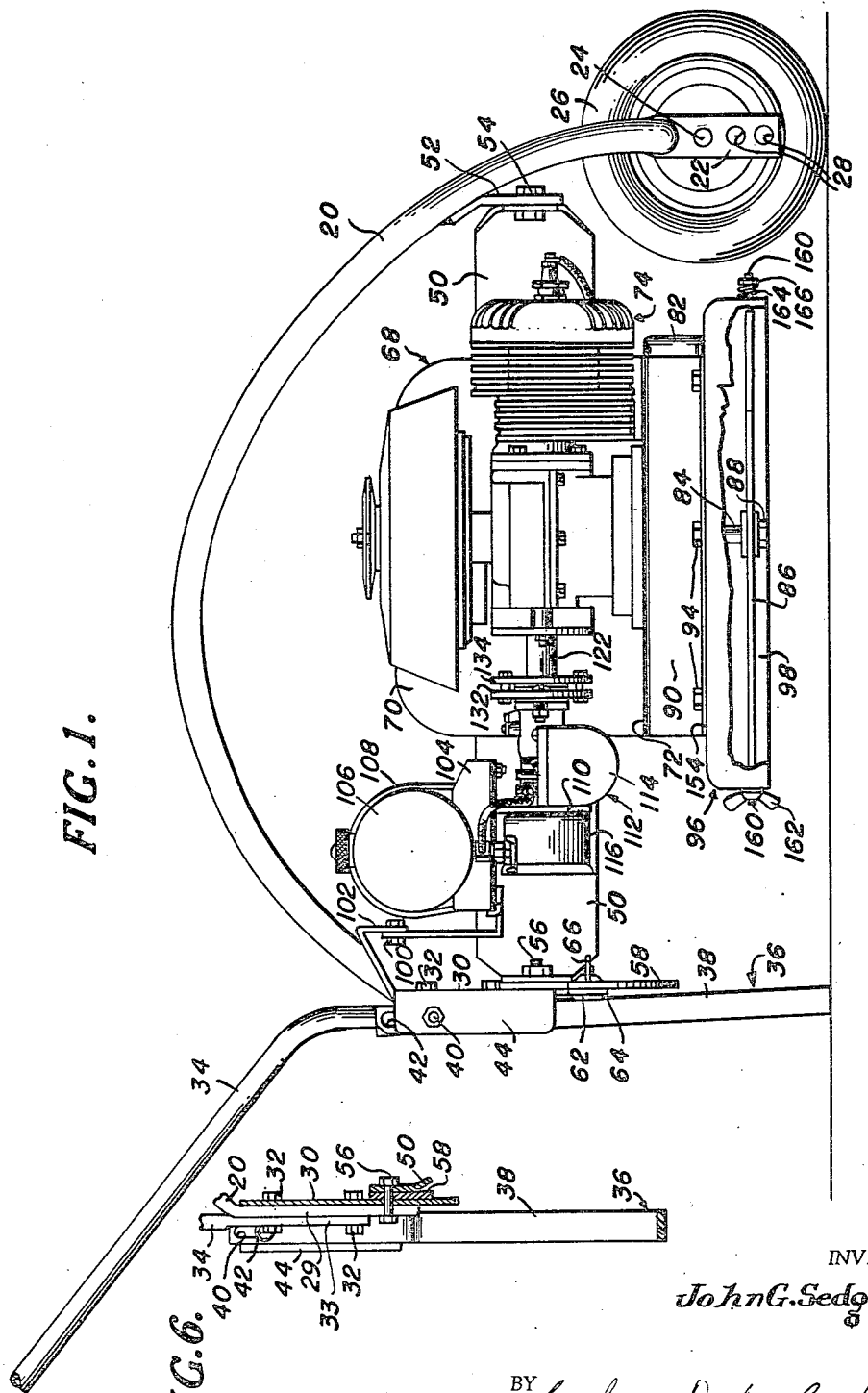

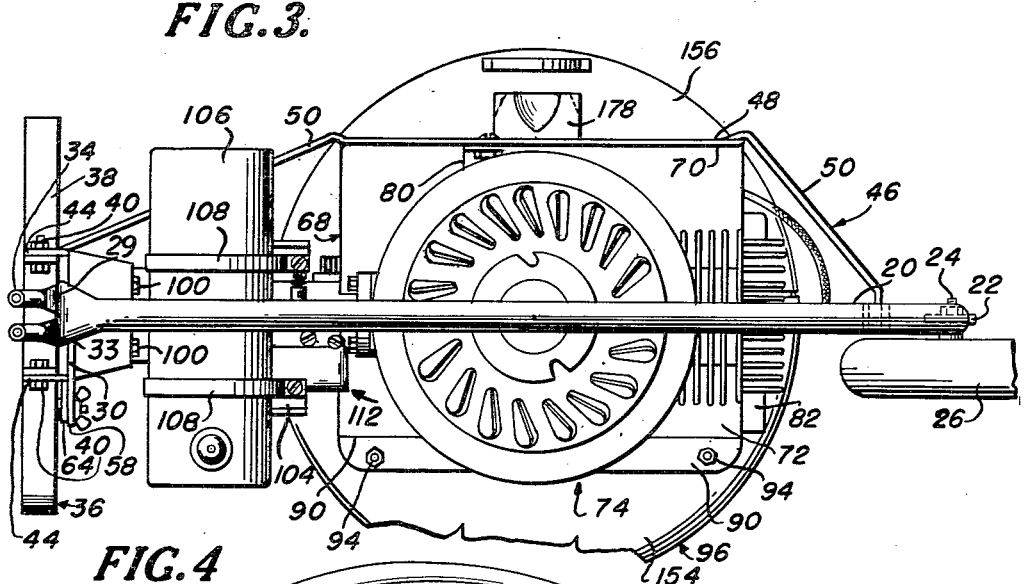
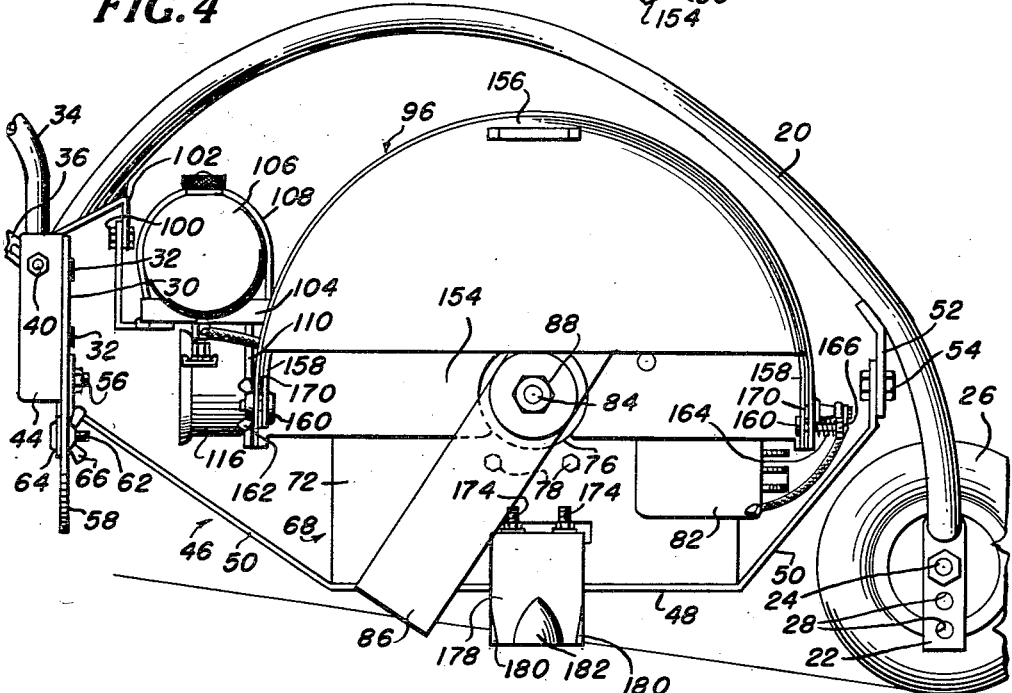

Dec. 18, 1956   J. G. SEDGWICK   2,774,207
POWER MOWER WITH PIVOTAL CONNECTION
BETWEEN CARBURETOR AND MOTOR
Filed July 2, 1953   5 Sheets-Sheet 4
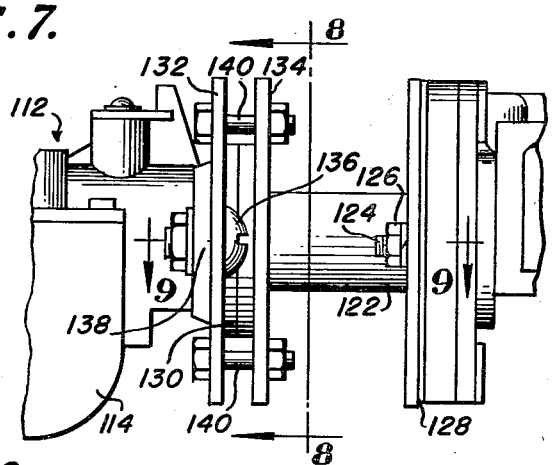
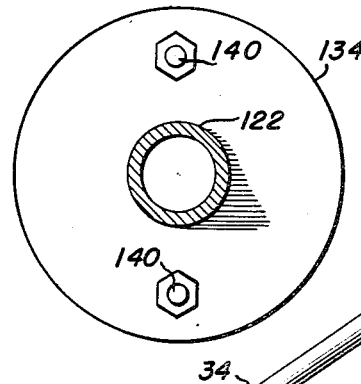
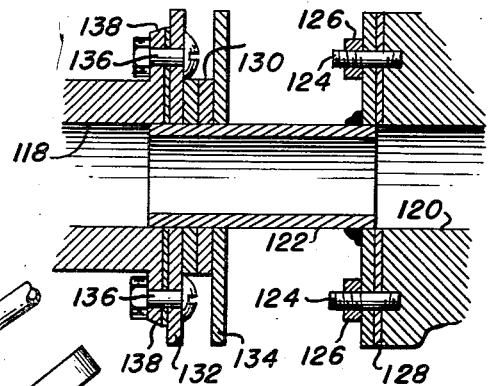
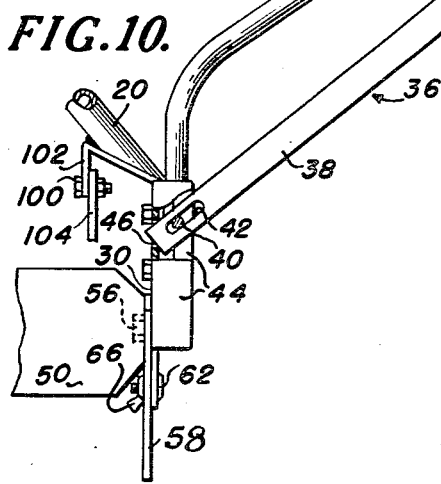
INVENTOR
John G. Sedgwick
BY Cushman, Darby & Cushman
ATTORNEYS Dec. 18, 1956   J. G. SEDGWICK   2,774,207
POWER MOWER WITH PIVOTAL CONNECTION
BETWEEN CARBURETOR AND MOTOR
Filed July 2, 1953   5 Sheets-Sheet 5
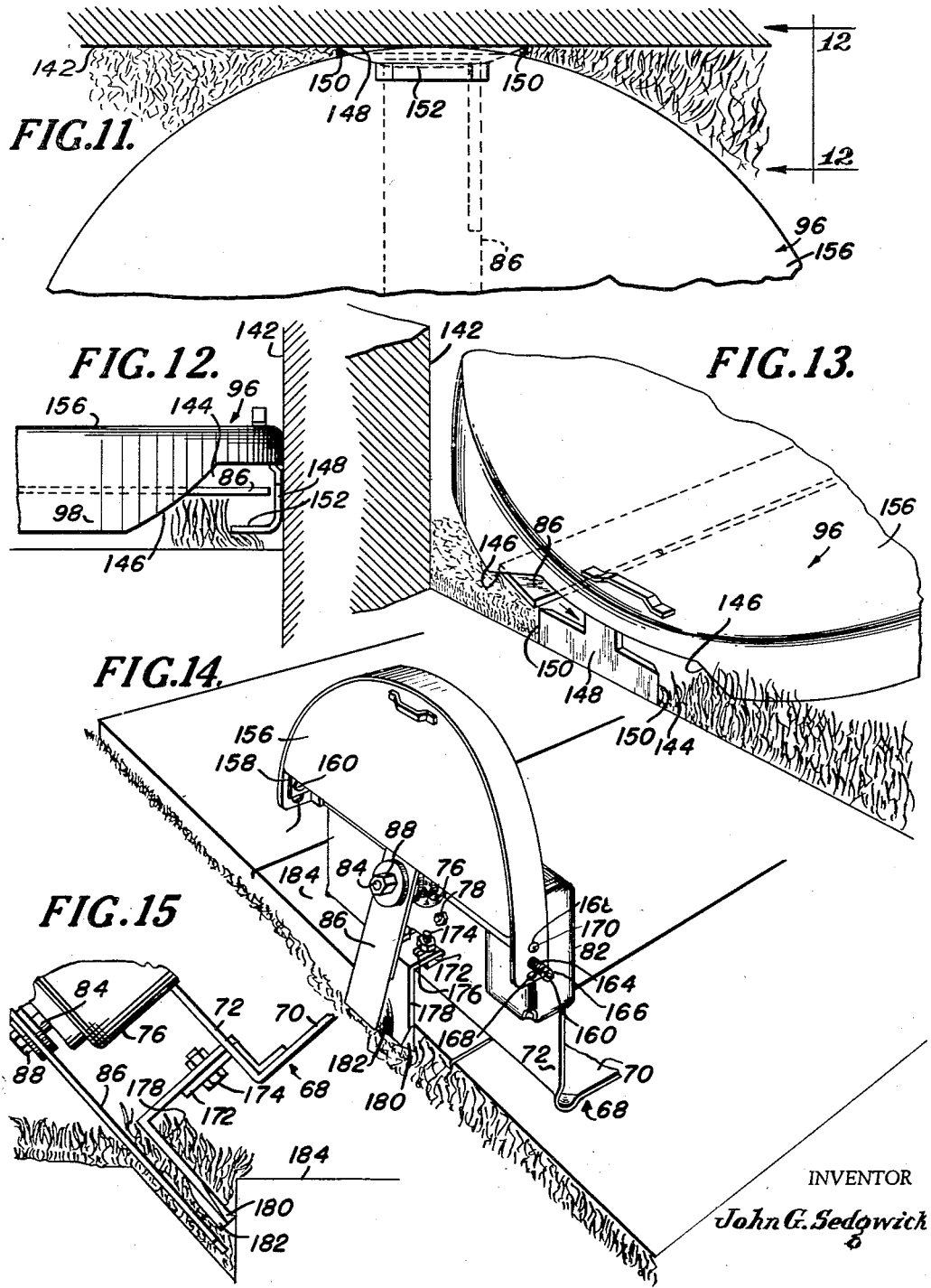
INVENTOR
John G. Sedgwick
BY Cushman, Darby & Cushman
ATTORNEYS

United States Patent Office 2,774,207
Patented Dec. 18, 1956

2,774,207

POWER MOWER WITH PIVOTAL CONNECTION BETWEEN CARBURETOR AND MOTOR

John G. Sedgwick, Houston, Tex.

Application July 2, 1953, Serial No. 365,637

4 Claims. (Cl. 56—25.4)

This invention relates to power machines for edging and trimming lawns, and more particularly to such machines having a rotary cutting blade, as contrasted to a reel, the axis of rotation of which blade is adjustable between horizontal and vertical positions.

Machines of the type under consideration are known in the art, and consist of a wheeled frame having a power-driven rotary cutting blade. The axis of rotation of the cutting blade is adjustable between substantially vertical and substantially horizontal positions, so that the plane of the blade may be disposed in a substantially horizontal position for trimming against walls, trees, or the like, or disposed in a substantially vertical or inclined position for edging a lawn in the usual trench along sidewalks, or curbs, or bevelling a lawn at the edge of a slope.

Machines of this type, however, because of various difficulties, are not normally powered by an internal combustion engine and rely for their power upon an electric motor, which necessitates a long extension cord to reach an appropriate source of electric energy. The attendant difficulties of this type of power include the possibility of cutting the cord by the machine, the necessity of keeping the cord out of the way of the machine, and the inability to move the machine about with complete freedom. Further, in areas where a source of electricity is not readily available, or the lawn to be edged is too remote from a source of electricity to permit the use of an extension cord, electric-powered machines cannot be used.

Power-driven edging and trimming machines of the type under consideration usually have a circular blade cover having a depending peripheral skirt. The presence of this skirt somewhat lessens the ability of the machine to cut close to an upright wall or the like, and if a portion of the cover is cut away or eliminated at one side of the machine to permit the blade to extend into close proximity to a wall, the blade is apt to strike the wall with resulting damage to the machine. Further, in known machines when the plane of the cutting blade is disposed in an inclined or substantially vertical position, the entire underside of the blade is exposed to create a hazardous condition. Further, the entire lower portion of the path of travel of the blade is uncovered, which increases the possibility of damage thereto by striking against an edge of a sidewalk or the like.

Therefore, it is an object of this invention to provide a lawn edging and trimming machine of the type described of simple design and which is powered by an internal combustion engine.

It is another object of this invention to provide a machine of the type under consideration that will cut very close to an upright wall or the like without any possibility of the cutting blade striking the wall.

It is another object of this invention to provide a machine of the type under consideration with a guard cover for the blade that is adjustable to form a housing entirely enclosing at least the upper half of the path of travel of the blade when the plane of the latter is disposed in an inclined or substantially vertical position.

It is another object of this invention to provide a machine of the type under consideration with means for preventing the blade from striking against the edge of a sidewalk, a curb, or the like when the machine is used for edging purposes.

It is a further object of this invention to provide a machine of the type under consideration that is compact, light in weight with resulting increase in mobility, relatively simple in design, and easy to operate.

Other objects, advantages, and novel features of the invention will be apparent from the following description and accompanying drawings, in which:

Figure 1 is a side elevational view of a machine embodying this invention with the plane of the cutting blade adjusted to a horizontal position for trimming purposes.

Figure 2 is an elevational side view of the machine shown in Figure 1, but taken from the opposite side thereof.

Figure 3 is a fragmentary plan view of the machine shown in Figure 1.

Figure 4 is a view corresponding to Figure 1, but illustrating the plane of the cutting blade adjusted to a vertical position for edging purposes.

Figure 5 is a fragmentary rear elevational view of the machine shown in Figure 4.

Figure 6 is a vertical sectional view taken on line 6—6 of Figure 5.

Figure 7 is an enlarged fragmentary view of a portion of the machine shown in Figure 1.

Figure 8 is a vertical sectional view taken on line 8—8 of Figure 7.

Figure 9 is a horizontal sectional view taken on line 9—9 of Figure 7.

Figure 10 is a fragmentary view of a portion of Figure 2 showing the supporting stand in raised or elevated position, and with portions cut away to illustrate details more clearly.

Figure 11 is an enlarged fragmentary plan view illustrating the operation of the machine when edging against a wall.

Figure 12 is an elevational view taken on line 12—12 of Figure 11.

Figure 13 is a fragmentary perspective view corresponding to Figure 11 with portions of the wall cut away in order to illustrate details.

Figure 14 is a fragmentary perspective view illustrating the operation of the machine when edging along a sidewalk.

Figure 15 is a fragmentary end elevational view corresponding to Figure 14, but showing the plane of the cutter blade adjusted to an inclined position.

Referring now to Figures 1 to 3 of the drawings, there is shown therein a lawn trimming and edging machine embodying this invention. The machine includes a frame in the form of a generally arch-shaped tubular member 20 having a longitudinally-flattened substantially vertically-disposed front end 22. A journal pin 24 extends through a transverse aperture in the frame front end 22 and is bolted thereto. Rotatably mounted on the pin 24 is a rubber-tired wheel 26 for supporting the frame 20 for rolling engagement with the ground. Preferably, a series of vertically-spaced apertures 28 are provided in the front end 22 of the frame to enable the mounting of the wheel 26 at alternative locations in order to adjust the height of the frame 20 with respect to the ground. At its rear end, the tubular frame member 20 terminates in a transversely flat substantially vertically disposed portion 29 having a flat plate-like member 30 secured thereto, as by welding. Secured, as by bolts 32 extending through the flat portion 29 of the frame and the member 30, is the flattened lower end 33 of an upwardly and rearwardly inclined handle 34 which terminates in conventional transverse hand-grips (not shown).

A generally U-shaped supporting-stand 36 has upstanding legs 38 (Figure 5) which converge inwardly and thence in substantially parallel relation. Bolts 40 extend through vertically-elongated slots 42 in the upper ends of the legs 38 and transversely through rearwardly-extending side flanges 44 on the plate-like member 30 to slidably and pivotally mount the stand 36 on the frame 20. From this construction, it will be seen that when the stand 36 is in the position shown in Figures 1 to 3, 5 and 6, the base of the supporting stand will be in contact with the ground to support the machine in an upright position and that pivotal movement of the stand will be restrained by engagement of its legs 38 against the plate-like member 30. By lifting the machine by the handle 34, however, the stand 36 may be dropped or shifted downwardly and then pivoted rearwardly and upwardly. In this position of the stand 36, it may be shifted slightly forwardly to project an end of one of the legs 38 thereof through an appropriate aperture 46 in the plate-like member 30 to lock the stand in its raised position, as shown in Figure 10.

Mounted for pivotal adjustment about a substantially horizontal axis extending longitudinally of the frame 20 and bridging the arch thereof is a somewhat U-shaped strap-like supporting member 46 having a flat base portion 48 and divergent legs 50. Depending from the tubular frame member 20 adjacent and above the front end 22 thereof is an apertured lug 52 having a bolt 54 pivotally connecting the forward leg 50 of the supporting member 46 thereto. The rearward leg 50 of the supporting member 56 is similarly pivotally connected to the plate-like member 30 by a bolt 56 aligned with the bolt 54. A transversely-extending plate-like sector 58 having a 90° arcuate slot 60 therein (Figure 5) is secured to the rearward leg 50 of the supporting member 46, as by welding. A bolt 62 extends through an apertured lateral arm 64 on the plate-like member 30 and through the slot 60 to provide a 90° limitation to the extent of pivotal movement of the supporting member 46 relative to the frame 20. A wing nut 66 on the bolt 62 provides means for securing the supporting member 46 in various positions of pivotal adjustment.

A generally L-shaped plate-like engine support or bed 68 has one of the legs 70, 72 thereof secured, as by welding, substantially flatwise to the base portion 48 of the pivotally-mounted supporting member 46. Mounted on the other leg 72 of the bed is a conventional one-cylinder air-cooled internal combustion engine 74 having a generally circular portion 76 of its crank-case housing extending through the leg 72. Bolts 78 extend through the leg 72 and into threaded apertures in the engine to fasten the latter securely to the bed 68. Preferably, a brace 80 (Figure 3) is bolted to the leg 70 of the bed 68 and to an appropriate location on the engine 74 for achieving additional rigidity thereof with respect to the bed. The engine 74 has the usual muffler 82 bolted in place beneath the leg 72 of the bed and appropriately connected through the leg 72 to the engine exhaust outlet.

Projecting from the circular portion 76 of the engine crank-case is the engine drive shaft 84, and a propellor-like rotary cutting blade 86 is mounted on the end of the shaft and secured thereto for rotation therewith by a nut 88. A depending flange 90 on the longitudinal edge of the leg 72 of the engine bed has an outturned lip 92 to which is secured, as by bolts 94 (Figures 1 and 3), a circular guard cover 96 for the blade 86 having a depending peripheral skirt 98.

Rigidly secured, as by bolts 100, to a depending lug 102 on the frame member 20, adjacent the rear end thereof, is a supporting bracket 104 having a fuel tank 106 secured thereto, as by straps 108. The bracket 104 has a depending flange portion 110 (Figures 1 and 4) on which is mounted a carburetor 112 for the engine 74 having a conventional float-valve-equipped carburetor bowl 114 (Figures 1 and 7). Preferably, the air intake for the carburetor 112 has an air cleaner 116 attached thereto.

The mixture outlet 118 (Figure 9) from the carburetor 112 is substantially circular and extends substantially in axial alignment with the pivotal axis of the generally U-shaped supporting member 46. The mixture inlet 120 of the engine has a flanged tubular extension 122 secured thereto, as by studs 124 and nuts 126, with a gasket 128 interposed therebetween. The extension 122 is axially aligned with the mixture outlet 118 and partially projects snugly thereinto for swiveling movement relative thereto. A seal between the carburetor mixture outlet 118 and the engine inlet extension 122 is provided by annular gaskets 130 surrounding the extension 122 and compressed between rigid annular washers 132 and 134. The washer 132 is secured, as by bolts 136, to ears 138 on the end of the carburetor outlet 118, and the washer 134 is secured, as by bolts 140, to the washer 132 for compressing the sealing gaskets 130 therebetween and effecting a tight seal.

It will thus be seen that the engine 74, and consequently the axis of rotation of the cutting blade 86, can be pivoted about a substantially horizontal axis extending longitudinally of the machine frame 20 while maintaining the carburetor 112 in a fixed upright position relative to the frame, so that the carburetor float valve will function properly at all times. Obviously, should the carburetor, and consequently its float valve, be inclined too far from the horizontal, the float valve would not function properly and either flood the engine or shut off the fuel supply thereto, with consequent stoppage of the engine in either event.

With the parts in the position shown in Figures 1 to 3, i. e., with the plane of the blade 86 disposed substantially horizontal and the blade rotating about a vertical axis, the rear supporting stand 36 may be raised as heretofore described and by supporting the machine by its handle 34 the machine may be maneuvered and propelled along the ground for trimming grass closely adjacent an upright wall 142 or the like, as shown in Figures 11 to 13. Of course, the machine can be used in this position for general mowing purposes, but such is not the principal intended purpose of the machine.

It will be seen that the depending peripheral skirt 98 of the guard cover 96 is cut away, as at 144, for a considerable arcuate extent at one side of the machine, as is best shown in Figures 2, 12, and 13, the end edges 146 of this cut-away portion being downwardly divergent or inclined. Depending into the central portion of this cut-out 144 is a blade guard 148 having a substantially plane outer surface disposed substantially tangentially with respect to the circular outline of the guard cover 96. The blade guard 148 is of substantially inverted T-shaped configuration, and the ends of the arms of the T are somewhat bevelled or sharpened, as at 150 (Figures 11 and 13). The lower portion of the blade guard 148 has an inwardly-extending flange or lip 152 (Figures 11 and 12) beneath the plane of the cutting blade 86 and substantially underlapping the end of the blade when the latter extends transversely of the machine. The end edges of the lip are inwardly divergent, as best shown in Figure 11.

In operation of the machine for trimming purposes, the machine is pushed along a wall 142 with the blade guard 148 in engagement therewith and sliding therealong. Because of the cut-out 144 in the peripheral skirt 98 of the guard cover 96, grass growing close to the wall 142 readily enters the guard cover to be cut by the blade 86. In this connection, it will be seen that the bevelled ends 150 of the arms of the blade guard 148, together with the inclined ends of the inturned lip 152, serve to scoop grass within the guard cover 96 for severance by the cutting blade. It also will be noted that the lip 152 on the guard 148 acts as a foot, in the event that that side of the machine is tilted downwardly, and thus prevents the end of the blade from digging into the ground. Because of this feature, the machine can trim closer to a wall than machines heretofore known.

For edging or bevelling purposes, the wing nut 66 is loosened and the support 46, together with the engine 74, is pivoted about a longitudinal axis until the plane of the blade 86 is substantially vertical or, for some edging operations, somewhat inclined with respect to vertical, whereupon the wing nut 66 is tightened to maintain the plane of the blade in this adjusted position.

The guard cover 96 is formed in two unequal segments 154 and 156 that are hinged together about a longitudinally-extending major chord of the cover. The larger segment 154 is fixed to the engine bed 68 by the bolts 94, while the smaller segment 156 has pivot lugs or ears 158 (Figures 4 and 14), essentially constituting extensions of its depending peripheral skirt, projecting within and overlapping the skirt portions of the fixed segment 154. Substantially diametrically aligned bolts 160 extending through the ears 158 and the skirt portion of the fixed segment 154 hingedly secure the smaller segment 156 thereto. A wing nut 162 is threaded onto one of the bolts 160, while the other bolt has a coil compression spring 164 thereon interposed between the outer surface of the skirt and a hex-nut 166. On opposite sides of the bolts 160, the skirt of the fixed segment is provided with apertures 168 for engagement with projecting detents 170 (Figures 4 and 14) on the ears 158 of the smaller segment 156 to restrain the latter against movement from either of its two adjusted positions. In operation of the machine as a lawn edger, the wing nut 162 is loosened and the movable segment 156 of the blade cover 96 is pivoted with respect to the fixed segment 154 so that the skirt portion of the movable segment is enclosed within the fixed segment. The two parts then constitute a housing enclosing substantially the entire upper half of the path of rotation of the blade as shown in Figures 4 and 14, to thereby minimize exposure of and resulting danger from the rapidly-rotating blade 86.

A flange-like lug 172 extends beneath the leg 72 of the engine bed 68 and has bolts 174 extending therethrough and engaged within elongated apertures 176 (Figure 14) in a generally L-shaped plow-like blade guard 178. The guard 178 extends transversely of the machine and depends in adjustably spaced parallelism with the plane of rotation of the blade 86 almost to the end of the blade. The opposite edges of the lower end of this blade guard 178 are sharpened or bevelled, as at 180, while the central portion of the lower end of the blade guard has a rounded central protuberance 182 facing the plane of the blade.

In operation of the machine for edging along the usual trench bordering a sidewalk 184 (Figures 14 and 15) or the like, the blade guard 178 is adjusted to achieve a relatively small spacing between the guard and the plane of rotation of the blade. The guard 178 is then engaged against the edge of the walk 184 and the machine pushed along the walk with the wheel 26 rolling thereon to trim grass growing in the trench. It will be seen that the guard 178 positively precludes the possibility of the blade 86 striking against the edge of the walk 184, while at the same time the sharp edges 180 of the guard combined with its central protuberance 182 force grass outwardly away from the edge of the walk to be cut by the rapidly-rotating blade.

In the event that the trench along the edge of a sidewalk is relatively wide, as is shown in Figure 15, the machine may be adjusted so that the plane of the blade 86, and the guard 178, is inclined from the vertical, as is also shown in Figure 15, so that the blade will cut the grass at the inclined outer side of the trench. Again, it will be seen that the blade guard 178 engages the edge of the walk 184 to positively preclude the possibility of the blade 86 striking thereagainst.

It will be noted that since both edges of the blade guard 178 and both ends of the blade guard 148 are bevelled or sharpened, the machine will operate effectively in both directions, i. e., whether it is pushed or pulled for edging or trimming purposes.

It will thus be seen that the objects of this invention have been fully and effectively accomplished. It will be realized, however, that the specific embodiment illustrated and described for the purpose of disclosing the principles of this invention is susceptible of change without departing from such principles. Accordingly, this invention includes all modifications encompassed by the spirit and scope of the following claims.

I claim:

1. In an edging and trimming machine the combination comprising: a wheeled frame; an internal combustion engine including a mixture inlet; means for adjustably mounting said engine on said frame for pivotal movement about a substantially horizontal axis extending longitudinally of said frame, said means comprising locking means for retaining said engine in an adjusted position; a cutting blade drivingly connected to said engine for pivotal movement therewith and rotation thereby; a carburetor for said engine fixed to said frame and including a mixture outlet; and a swivel connection between the mixture outlet of said carburetor and the mixture inlet of said engine.

2. The structure defined in claim 1 in which the frame is generally arch-shaped in side view and has a ground-engaging wheel at the front end thereof, and the engine mounting means comprises a generally U-shaped member having one leg thereof pivotally connected to the front of said frame and having another leg thereof pivotally connected to the rear end of said frame.

3. The structure defined in claim 1 in which the frame is generally arch-shaped in side view and has a ground-engaging wheel at the front end thereof, in which the engine mounting means is pivotally connected to the front and rear ends of said frame, and including a raisable ground-engaging stand mounted on the rear end of said frame.

4. In an edging and trimming machine the combination comprising: a wheeled frame; a support; an internal combustion engine mounted on said support and having a drive shaft extending transversely of said frame and also having a mixture inlet; a cutting blade mounted on said drive shaft; means adjustably mounting said support on said frame for pivotal movement about a substantially horizontal axis extending longitudinally of said frame, whereby the axis of rotation of said blade may be adjusted between vertical and horizontal position, and said means including locking means for retaining said engine in an adjusted position; a carburetor for said engine fixed on said frame and including a mixture outlet; and means providing a swivel connection between the mixture outlet of said carburetor and the mixture inlet of said engine aligned with said support pivotal axis.

References Cited in the file of this patent
UNITED STATES PATENTS

| | | |
|---|---|---|
| 2,212,057 | Waller | Aug. 20, 1940 |
| 2,410,196 | Benthall | Oct. 29, 1946 |
| 2,414,830 | McCollum | Jan. 28, 1947 |
| 2,539,619 | Goodall | Jan. 30, 1951 |
| 2,608,043 | Berdan | Aug. 26, 1952 |
| 2,621,463 | Skillman | Dec. 16, 1952 |
| 2,675,662 | Kroll | Apr. 20, 1954 |